United States Patent
Dempsey et al.

(10) Patent No.: US 12,236,035 B2
(45) Date of Patent: Feb. 25, 2025

(54) FORCE SENSING DEVICE

(71) Applicant: Peratech IP Ltd., North Yorkshire (GB)

(72) Inventors: Sarah Jessica Dempsey, Durham (GB); Matthew Gospel, Scorton (GB)

(73) Assignee: Peratech IP Ltd, North Yorkshire (GB)

( * ) Notice: Subject to any disclaimer, the term of this patent is extended or adjusted under 35 U.S.C. 154(b) by 0 days.

(21) Appl. No.: 18/108,047

(22) Filed: Feb. 10, 2023

(65) Prior Publication Data

US 2023/0195251 A1 Jun. 22, 2023

Related U.S. Application Data

(63) Continuation of application No. PCT/GB2021/000088, filed on Aug. 9, 2021.

(30) Foreign Application Priority Data

Aug. 10, 2020 (GB) .................................... 2012390

(51) Int. Cl.
*G06F 3/041* (2006.01)
*G01L 1/20* (2006.01)
(Continued)

(52) U.S. Cl.
CPC .......... *G06F 3/04144* (2019.05); *G01L 1/205* (2013.01); *G01L 1/18* (2013.01);
(Continued)

(58) Field of Classification Search
CPC ....... G06F 3/04144; G06F 2203/04103; G06F 3/0414; G06F 3/04146; G01L 1/205;
(Continued)

(56) References Cited

U.S. PATENT DOCUMENTS 10,690,559 B1 * 6/2020 Liu .......................... H01M 4/02
2010/0225613 A1 * 9/2010 Iwasaki ................... G06F 3/045
345/174

(Continued)

FOREIGN PATENT DOCUMENTS

CN 105929577 B * 1/2020 ......... G02F 1/13338

OTHER PUBLICATIONS

Corresponding International Patent Application No. PCT/GB2021/000088, International Search Report, date mailed Nov. 17, 2021.
(Continued)

*Primary Examiner* — Douglas M Wilson
(74) *Attorney, Agent, or Firm* — Cooper Legal Group LLC

(57) ABSTRACT

A force sensing device comprises a sensing array comprising a first conductive layer having a plurality of conductive rows and a second conductive layer having a plurality of conductive columns. The plurality of conductive rows and plurality of conductive columns are arranged to define a plurality of intersections. The force sensing device also comprises an electro-active layer overlaying the first conductive layer and comprising a pressure sensitive element at each intersection. A force concentrating structure is positioned at each intersection on the second conductive layer.

17 Claims, 8 Drawing Sheets

(51) Int. Cl.
*G01L 1/22* (2006.01)
*G01L 1/18* (2006.01)
*G01L 5/1623* (2020.01)

(52) U.S. Cl.
CPC .............. *G01L 1/20* (2013.01); *G01L 1/2287* (2013.01); *G01L 5/1623* (2020.01); *G06F 3/0414* (2013.01); *G06F 3/04146* (2019.05); *G06F 2203/04103* (2013.01)

(58) Field of Classification Search
CPC . G01L 1/18; G01L 1/2287; G01L 1/20; G01L 5/1623
See application file for complete search history.

(56) References Cited

U.S. PATENT DOCUMENTS

| | | | | |
|---|---|---|---|---|
| 2011/0227836 A1* | 9/2011 | Li | ........................ | G06F 3/04144 977/932 |
| 2013/0275057 A1* | 10/2013 | Perlin | .................... | G06F 3/0414 702/41 |
| 2014/0107532 A1 | 4/2014 | Anderson | | |
| 2014/0267114 A1* | 9/2014 | Lisseman | ................. | G06F 3/016 345/173 |
| 2015/0309651 A1* | 10/2015 | Papakostas | ......... | G06F 3/04144 345/174 |
| 2017/0357344 A1* | 12/2017 | Hong | .................... | G06F 3/0447 |
| 2019/0305052 A1 | 10/2019 | Wang | | |
| 2020/0133418 A1 | 4/2020 | Gospel | | |
| 2020/0408620 A1* | 12/2020 | Hong | ........................ | G01L 1/20 |
| 2022/0306888 A1* | 9/2022 | Swisher | ................. | C09D 11/38 |

OTHER PUBLICATIONS

Corresponding International Patent Application No. PCT/GB2021/000088, Written Opinion, date mailed Nov. 17, 2021.
Corresponding International Patent Application No. PCT/GB2021/000088, International Preliminary Report on Patentability, date mailed Oct. 26, 2022.

* cited by examiner

FORCE SENSING DEVICE

CROSS REFERENCE TO RELATED APPLICATIONS

This application is a continuation of and claims priority to International Patent Application number PCT/GB2021/000088, filed on 9 Aug. 2021, which claims priority from United Kingdom Patent Application number GB 20 12 390.7, filed on 10 Aug. 2020. The whole contents of International Patent Application number PCT/GB2021/000088 and United Kingdom Patent Application number GB 20 12 390.7 are incorporated herein by reference.

BACKGROUND OF THE INVENTION

The present invention relates to a force sensing device and a method of producing a force sensing device.

Multi-touch matrix sensors are known in the art and typically comprise arrangements of conductive layers having a plurality of rows and plurality of columns defining an intersection.

The applicant has developed matrix sensors to include sensing elements at the intersections of the rows and columns to provide additional pressure sensitivity. However, in use, when a force is applied by a user, some of this force is transmitted to areas between the sensing elements thereby reducing the pressure of the input force and decreasing the signal from the sensor.

In many applications, the matrix sensor is integrated beneath a top surface in an electronic device. A force is transmitted by a user through a top layer such as, for example, a display module or a track pad. This top layer acts to spread the applied force across a larger area of the matrix sensor and may activate a plurality of sensing elements directly beneath and to the side of the location of the applied force. Force is spread to the sensing elements (thereby generating a signal) and regions between the sensing elements (not generating a signal).

Thus, it is desirable to direct the force to sensing elements only, not to the regions between the sensing elements.

US 2013/275057 A1 (PERLIN KENNETH [US] ET AL) describes a force sensing array and an additional separate layer of supporting protrusions which allow a force or pressure applied to an upper plate to be mechanically transmitted to the supporting protrusions.

US 2019/305052 A1 (WANG YANG [CN]) describes a touch display panel having spacers on a cover plate and spacers on an opposite substrate. The cover plate includes touch signal lines, and the substrate includes metal lines which are in electrical contact with the touch signal lines.

BRIEF SUMMARY OF THE INVENTION

According to a first aspect of the present invention, there is provided a force sensing device.

According to a second aspect of the present invention, there is provided a method of producing a force sensing device.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

FIG. 1

Figure 1:
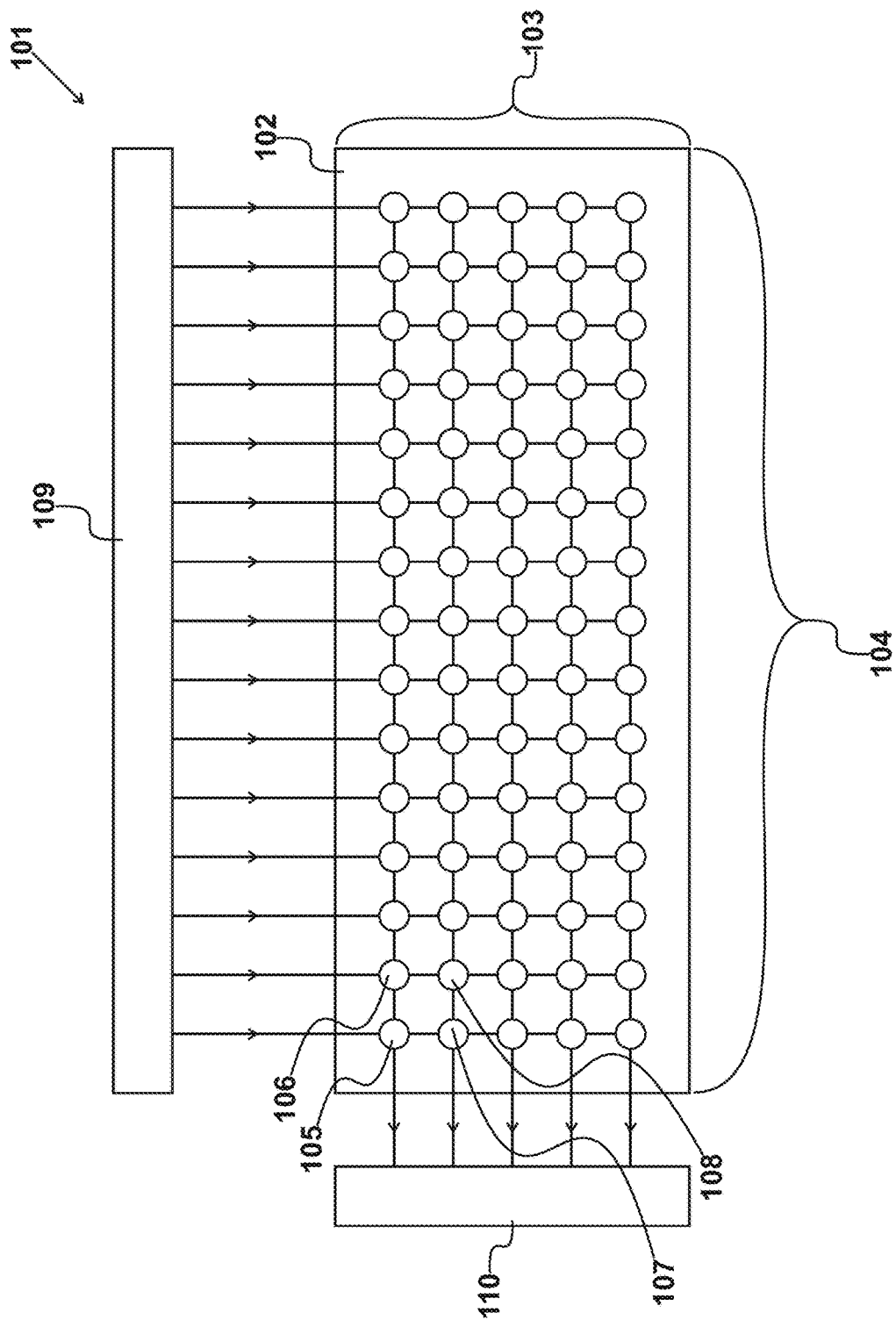
FIG. 1 shows a force sensing device comprising a sensing array in accordance with the present invention.

An example force sensing device 101 in accordance with the present invention is illustrated in a schematic plan view in FIG. 1.

Force sensing device 101 may be incorporated into any suitable electronic device, for example, an electronic device comprising a touch screen. Force sensing device 101 comprises a sensing array 102 which provides an electrical response to an applied force or applied pressure.

Sensing array 102 comprises a plurality of conductive rows 103 and a plurality of conductive columns 104 which are arranged to define a plurality of intersections. At each intersection, a pressure sensitive element is provided, such as pressure sensitive elements 105, 106, 107 and 108. The plurality of pressure sensitive elements are provided as an electro-active layer printed as part of the array.

In the embodiment, the plurality of conductive rows 103 are comprised as a first conductive layer and the plurality of conductive columns are comprised as a second conductive layer.

Each pressure sensitive element comprises a pressure sensitive material which is responsive to an applied pressure. In the embodiment, each pressure sensitive element comprises a quantum tunnelling material. The quantum tunnelling material may be of the type supplied by the applicant Peratech Holdco Limited under the trade mark QTC®, which exhibits a reduction in electrical resistance following the application of a force or pressure. In this way, the sensing array can be configured to provide both two-dimensional positional data and an extent property in response to an applied pressure.

In alternative embodiments, it is appreciated that alternative pressure sensitive materials may be utilized which exhibit a change in electrical resistance following the application of a force or pressure.

In this illustrated example, sensing array 102 comprises fifteen columns and five rows. It is appreciated that the number of rows and columns are an illustrative example, and any suitable number of rows and columns may be utilized depending on the application and customer requirements. Furthermore, while the illustrated example describes a square array, it is appreciated that other alternative array forms may be utilized, for example, a hexagonal array or similar.

A column connector 109 receives driving voltages from a processor and a row connector 110 supplies scan voltages to the processor. Without the application of force or pressure, all of the pressure sensitive elements at the intersections of sensing array 102 remain non-conductive. However, when sufficient pressure is applied to sensing array 102, this activates at least one of the pressure sensitive elements to provide a response between an input driving line and an output scanned line allowing two-dimensional positional data and an extent property to be calculated as necessary.

Figure 2B:
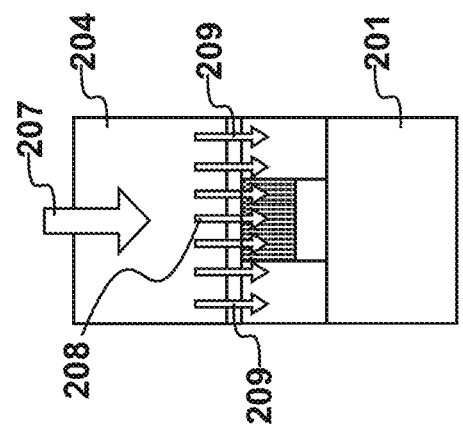
FIGS. 2A and 2B show a cross-sectional view of an example of an intersection in a sensing array.
Figure 2A:
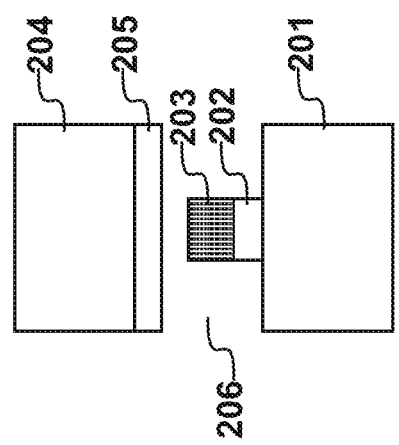

FIGS. 2A and 2B

An example pressure sensitive element which can be utilized in a sensing array such as sensing array 102 is shown in FIGS. 2A and 2B.

In the embodiment, the pressure sensitive element is positioned at the intersection of a conductive row and a conductive column. FIGS. 2A and 2B show an isolated cross section of the layers of sensing array in schematic form. Thus, the sensing array comprises a first substrate 201 onto which conductive row 202 is printed thereon to form a conductive electrode. Printed onto conductive row 202 is an electro-active layer which comprises one of the plurality of pressure sensitive elements 203 as shown. The pressure sensitive element 203 may comprise a quantum tunnelling material as described previously.

The force sensing device comprises a second substrate 204 onto which a corresponding conductive column 205 is printed to form a further conductive electrode which is substantially perpendicular to conductive row 202.

Between conductive electrode 205 and the electro-active layer is an air gap 206 which maintains the layers a distance apart in a rest configuration in which an external force has not been applied to the sensing array. This is illustrated with respect to FIG. 2A.

FIG. 2B, in contrast, shows the response of the pressure sensitive element in a configuration in which an external force, indicated by arrow 207, has been applied to the sensing array and the pressure sensitive element in question.

When a force is applied to substrate 204, a first component 208 of force 207 is transmitted through the pressure sensitive element 203 providing a response. However, a further component 209, is transmitted into the air gap 206 in the space around pressure sensitive element 203, which may be referred to as 'dead zones'.

Thus, when a force is applied, the conductive layers are brought into contact with the electro-active layer. A signal is only generated where contact with the electro-active layer (i.e. the pressure sensitive element) and it is this signal which is used to calculate a change in electrical resistance. However, in the space between each pressure sensitive element and the corresponding intersections, the pressure which is transmitted into the 'dead zones' does not generate a signal and some of the applied force is spread outwards affecting the calculated electrical resistance.

When incorporated into an electronic device, a cover layer is also typically present, which in turn causes a force distribution effect, ensuring that the force is distributed over a larger area, thereby resulting in a reduction in the overall pressure.

If the force is spread to neighboring pressure sensitive elements at neighboring intersections, this can be beneficial as the results can be utilized, however any force applied between each intersection reduces the signal output and reduces the effective force on each pressure sensitive element.

This is an increased problem with substantially thin force sensing devices which are increasingly attractive to industry due to the benefits of smaller, more flexible devices and their increased applicability.

The present invention proposes to include a force concentrating structure to address these issues at least and ensure that force is transmitted primarily to each pressure sensitive element rather than the spaces therebetween.

FIG. 3

Figure 3:
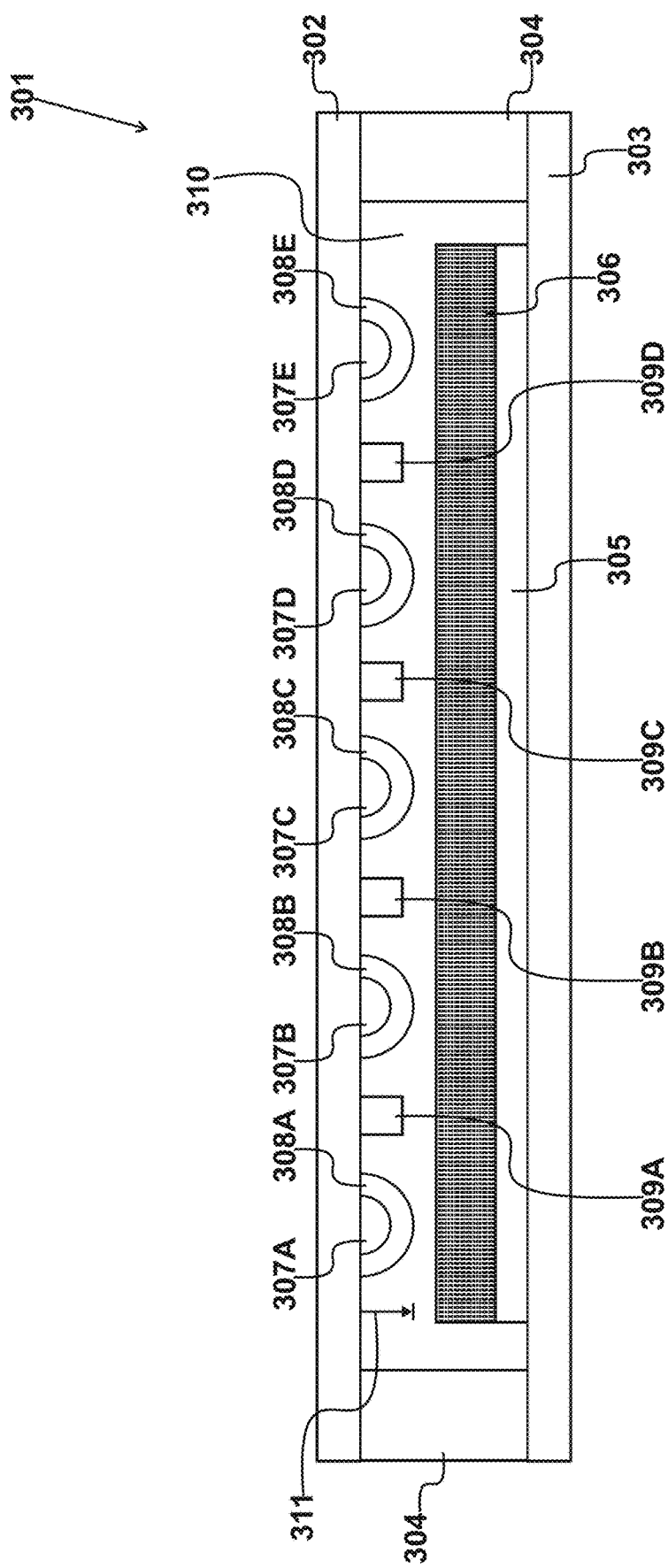
FIG. 3 shows a cross-sectional view of a force sensing device comprising a plurality of force concentrating structures.

In contrast into the conventional arrangement of the sensing array of FIGS. 2A and 2B, the present invention includes a force concentrating structure at each intersection in the sensing array. Thus, a force sensing device in accordance with the present invention is shown in FIG. 3 in schematic cross section.

Force sensing device 301 comprises a first substrate 302, a second substrate 303 which are separated by a spacer gasket 304.

Substrate 303 includes a plurality of conductive rows 305 printed thereon, with electro-active layer 306 overprinted on the conductive rows 305 in a pattern comprising a plurality of pressure sensitive elements such as those illustrated in FIG. 1 (105, 106, 107, 108).

In contrast, substrate 302 comprises a plurality of force concentrating structures 307. A conductive layer of columns 308 is printed over force concentrating structures 307. In the embodiment, a spacer layer comprising a plurality of spacer elements 309 is also provided so as to retain the structure of force sensing device 301.

In the embodiment, conductive layer 305 is separated from conductive layer 308 by means of air gap 310 therebetween. In the embodiment, each force concentrating structure 307 provides a protrusion of conductive layer 308 into air gap 310. This protrusion provides a comparatively three-dimensional structure compared to conventional two-dimensional structured force sensing devices, such that, the combination of the conductive layer 308 and force concentrating structures 307 protrude into air gap 310 by a given height 311. The protrusion height 311 is dependent on the thickness of conductive layer 308 and the thickness of force concentrating structure 307.

The first touch-sensitivity of the force sensing device can therefore be adapted by tuning the thickness of spacer gasket 304, the protrusion height 311 and the combined thickness of conductive layer 305 and electro-active layer 306. The first touch-sensitivity is the force required to deform substrate 302 and create electrical contact with electro-active layer 306 to enable a resistance to be calculated in the manner previously described with respect to FIG. 1.

FIGS. 4A, 4B, 4C and 4D

Force concentrating structure 307 can be constructed by any suitable means. FIG. 4 illustrates four separate examples in which force concentrating structure 307 can be constructed for use in force sensing device 301.

In the examples shown in FIGS. 4A, 4B, 4C and 4D, each example force concentrating structure is shown in isolation in combination with conductive layer 308 which surrounds the force concentrating structure in question.

In each of the example embodiments shown, the force concentrating structures may comprise a dielectric material and, in a specific embodiment the force concentrating structure comprises a dielectric ink. Thus, the dielectric material can be printed or deposited using a bead deposition process onto substrate 302.

Figure 4A:
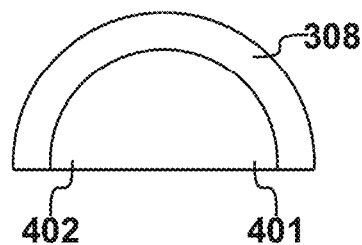
FIGS. 4A, 4B, 4C and 4D show example embodiments of force concentrating structures in accordance with the present invention.

In the embodiment depicted in FIG. 4A, force concentrating structure 401 is constructed by deposition of a single microbead 402 of dielectric material by means of a bead deposition process. As necessary, this procedure may involve a drying or curing process to ensure that bead 402 is successfully deposited onto substrate 302. Conductive layer 308 may then be printed over force concentrating structure 401 to complete the arrangement of FIG. 3.

Figure 4B:
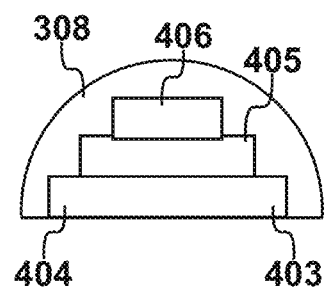

In the embodiment of FIG. 4B, force concentrating structure 403 illustrates an example whereby a plurality of printed layers of dielectric ink of differing radii are printed successively. Thus, a first dielectric ink layer 404 having a first radius is printed onto substrate 302. Subsequently, a second dielectric ink layer 405 is overprinted over first dielectric ink layer 404 having a smaller radius than that of dielectric ink layer 404. Similarly, a further layer of dielectric ink 406 is overprinted over dielectric ink layer 405 and this has a smaller radius again than both dielectric ink layers 404 and 405. In the embodiment, each layer is printed and then dried to ensure successful deposition onto substrate 302.

In contrast to existing conventional force sensing devices, the conductive layers are typically in the region of around six microns. The force concentrating structure in this case may therefore have a height in the region of eighteen microns due to the additional layering effect thereby creating a comparative three-dimensional structure.

Figure 4C:
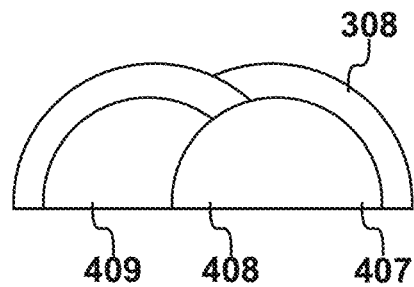
Figure 4D:
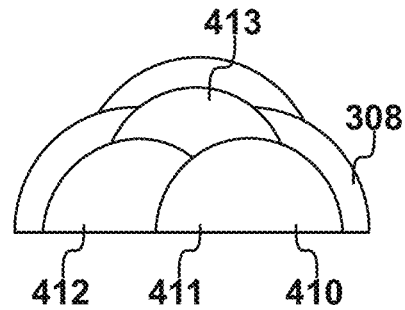

In the embodiments of FIGS. 4C and 4D, the deposition of a plurality of dielectric beads is conducted by means of a bead deposition process. Thus, in the embodiment of FIG. 4C force concentrating structure 407 comprises microbead 408 and microbead 409. Similarly, in the embodiment of FIG. 4D force concentrating structure 410 comprises three microbeads 411, 412 and 413 each deposited onto substrate 302. Conductive layer 308 is then overprinted over the respective microbeads to form the combined structure as shown.

FIG. 5

A method of producing a force sensing device in line with the embodiment shown in FIGS. 3 and 4 will now be described with respect to FIG. 5.

At step 501 substrate 302 is obtained and the force concentrating structure is deposited onto the substrate. As previously explained, this may involve printing a dielectric ink or the deposition of one or more microbeads of dielectric or polymer material by means of a bead deposition process.

At step 502, conductive layer 308 is printed in the manner of a plurality of conductive rows overlying the force concentrating structure. At step 503, the second conductive layer 308 comprising a plurality of conductive columns is printed onto substrate 303. At step 504 an electro-active layer comprising pressure sensitive elements (which are configured to be printed at each intersection of the conductive rows and columns when the conductive layers are combined in the manner of FIGS. 1 and 3) is printed over the second conductive layer.

At step 505 substrate 302 and substrate 303 are combined to create the force sensing device 301 in the manner shown in FIG. 3.

FIG. 6

Figure 5:
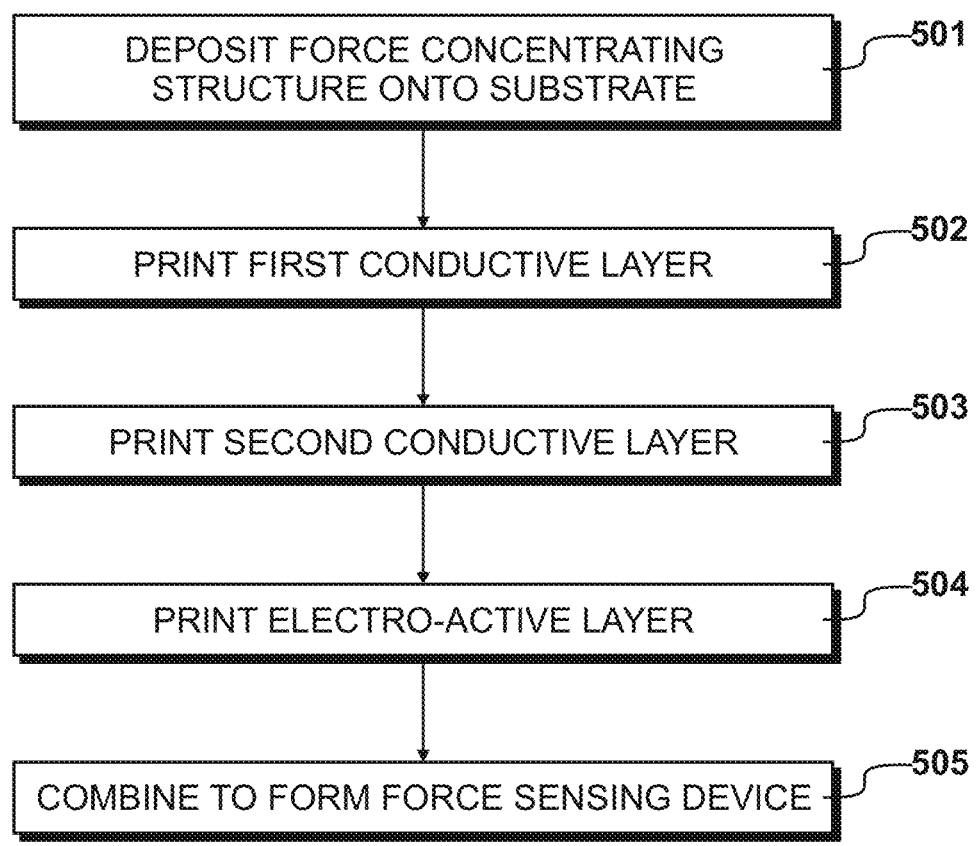
FIG. 5 shows a method of constructing a force sensing device comprising at least one force concentrating structure.
Figure 6:
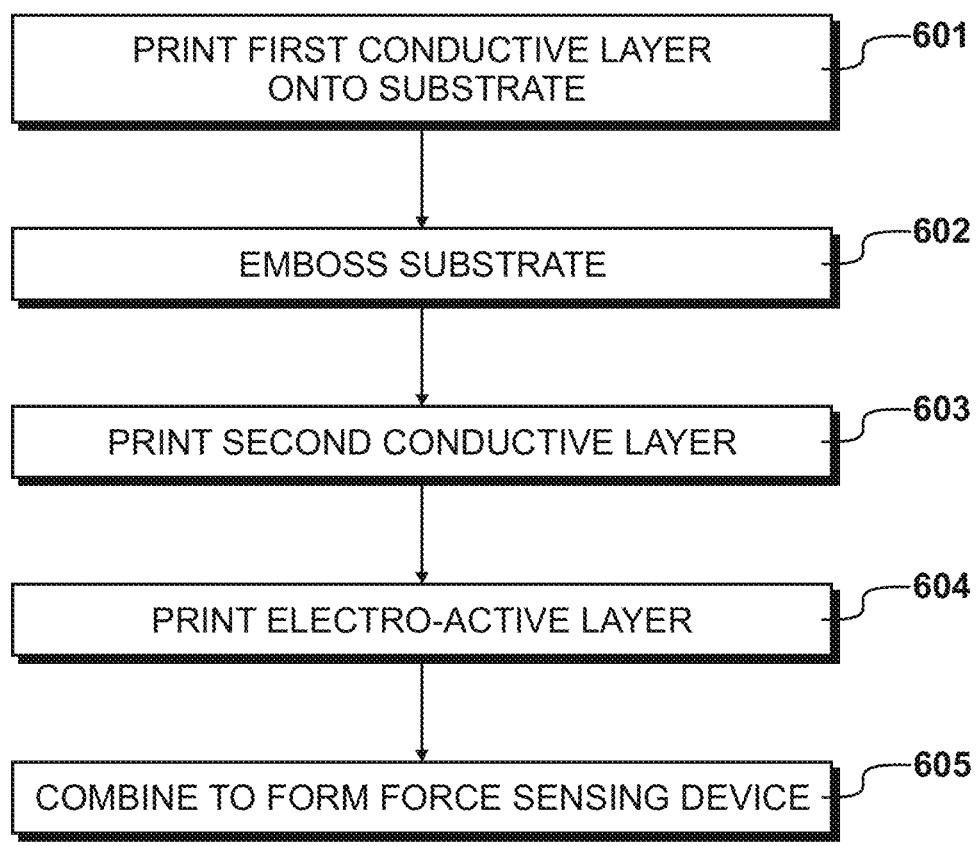
FIG. 6 shows an alternative method of constructing a force sensing device comprising at least one force concentrating structure.

An alternative method of producing a force sensing device providing an alternative to the dielectric ink or bead structures described with respect to FIGS. 4 and 5 is shown in FIG. 6.

In the embodiment of FIG. 6, substrate 302 is obtained and first conductive layer 308 is printed onto substrate 302 at step 601. In the embodiment, substrate 302 comprises a thermoplastic material and at step 602 the substrate comprising the conductive layer is embossed by an embossing process utilizing heat applied to the substrate as the substrate is rolled over a preform comprising a suitable shape for the force concentrating structures. Thus, the substrate and the first conductive layer is deformed in a manner to create the plurality of force concentrating structures which are positioned at the intersections of the sensing array in the end product.

At steps 603, the second conductive layer 305 is printed onto substrate 303 and the electro-active layer 306 is overprinted at step 604. Steps 603 and 604 are substantially similar to steps 503 and 504 in the previously described method. The substrates can then be combined to form a substantially similar force sensing device 301 at step 605.

It is appreciated that, alternative force concentrating structures may be created through alterative deposition routes to those indicated and it is further appreciated that the examples given are not exhaustive. Alternative deposition routes include monolithic deposition and growth of crystal structures in addition to those described herein. However, in each case the force concentrating structures protrude into the air gap beyond the conventional two-dimensional structures known in the art.

FIG. 7

Figure 7:
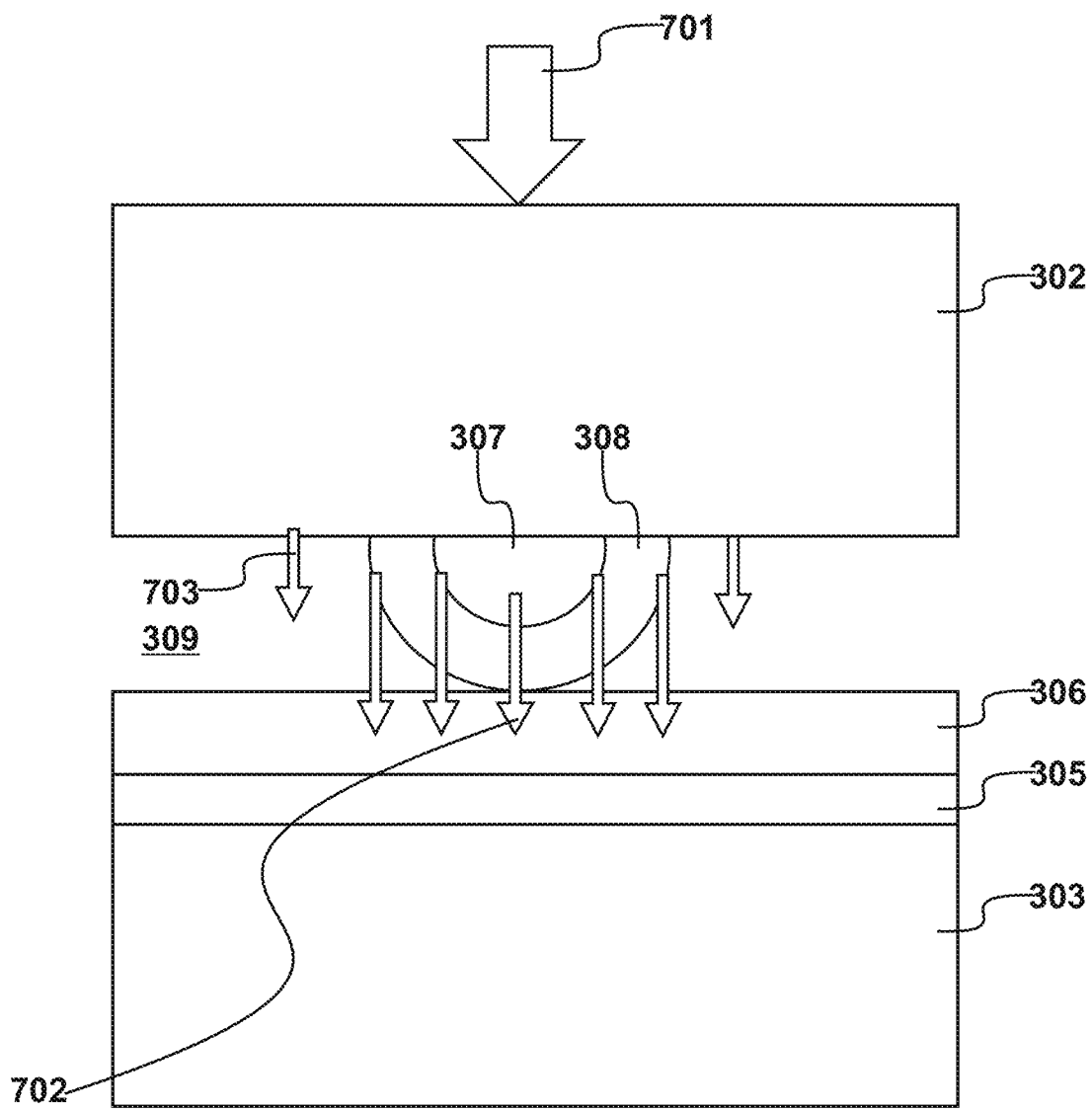
FIG. 7 shows the effect of a force concentrating structure in a force sensing device when a force is applied to the force sensing device.

A cross-sectional schematic of a single intersection in sensing array 102 is shown in FIG. 7. The schematic illustrates the effects of the force concentrating structure 307 when a force is applied to substrate 302 in use.

In the embodiment, a force, indicated by arrow 701, is applied to substrate 302, bringing force concentrating structure 307 and conductive layer 308 into contact with electro-active layer 306. In this embodiment, force 701 is transmitted through force concentrating structure 307 to conductive layer 308 to electro-active layer 306.

Force 701 is transmitted across the protruding conductive layer 308, such that the force received 702 by electro-active layer 306 aligns with the conductive layer 308. In the air gap 309, a limited amount of force 703 is transmitted to this area and does not contact with electro-active layer 306. Thus, force concentrating structure creates an effective three-dimensional structure compared to conventional force sensing devices in which the conductive layers are relatively thin and considered two-dimensional. In this way, each force concentrating structure avoids spreading the input force 701 across the layer and focusses the input force on the intersections.

At low forces therefore only the tip of the comparatively domed conductive layer 308 contacts the electro-active layer 306. However, at higher forces, an increased portion of the curved profile is brought into contact with the electro-active layer 306.

In an embodiment, the effect is increased by introducing a material for the force concentrating structure having a relatively high Young's modulus. This is typically provided by a material having a high Young's modulus comparison to the substrate material.

In conventional force sensing devices, the upper substrate traditionally provides a substantially flat surface which interacts with the electro-active layer. In such previous force sensing devices, a force threshold level is reached when all of the conductive layer is in contact with the electro-active layer. Increasing the force does not expand the area of contact at this force threshold which results in an on/off effect, thereby limiting the dynamic range of resistance which decreases with force at each intersection. The introduction of the force concentrating structure provides a solution to the on/off effect to ensure that contact between the conductive layers and electro-active layer and the corresponding pressure area is dependent on an applied force. Thus, the present invention increases the dynamic range of resistance decrease with applied force at each intersection of the sensing array.

This is beneficial in force sensing applications as the higher dynamic range allows for improved mapping of input force to a change in resistance. Thus, the change in resistance can be used to set a specific response such that different outputs can be provided in response to specific applied pressures. This may be affected by means of a software application in an electronic device in which the force sensing device is utilized.

In a further embodiment, a force sensing device in accordance with the invention, comprises a first array of force concentrating structures having a first height and a second array of force concentrating structures having a second height. In this embodiment, the first height and the second height are configured to be substantially different to each other. Thus, each of the force concentrating structures, may be responsive to different applied forces to provide further flexibility in the applications of the force sensing device. Thus, at low forces, the force concentrating structures having the greatest height would activate their corresponding pressure sensitive elements, and at higher forces, the higher force concentrating structures would provide activation along with the pressure sensitive elements corresponding to the lower height force concentrating structures.

FIG. 8

Figure 8:
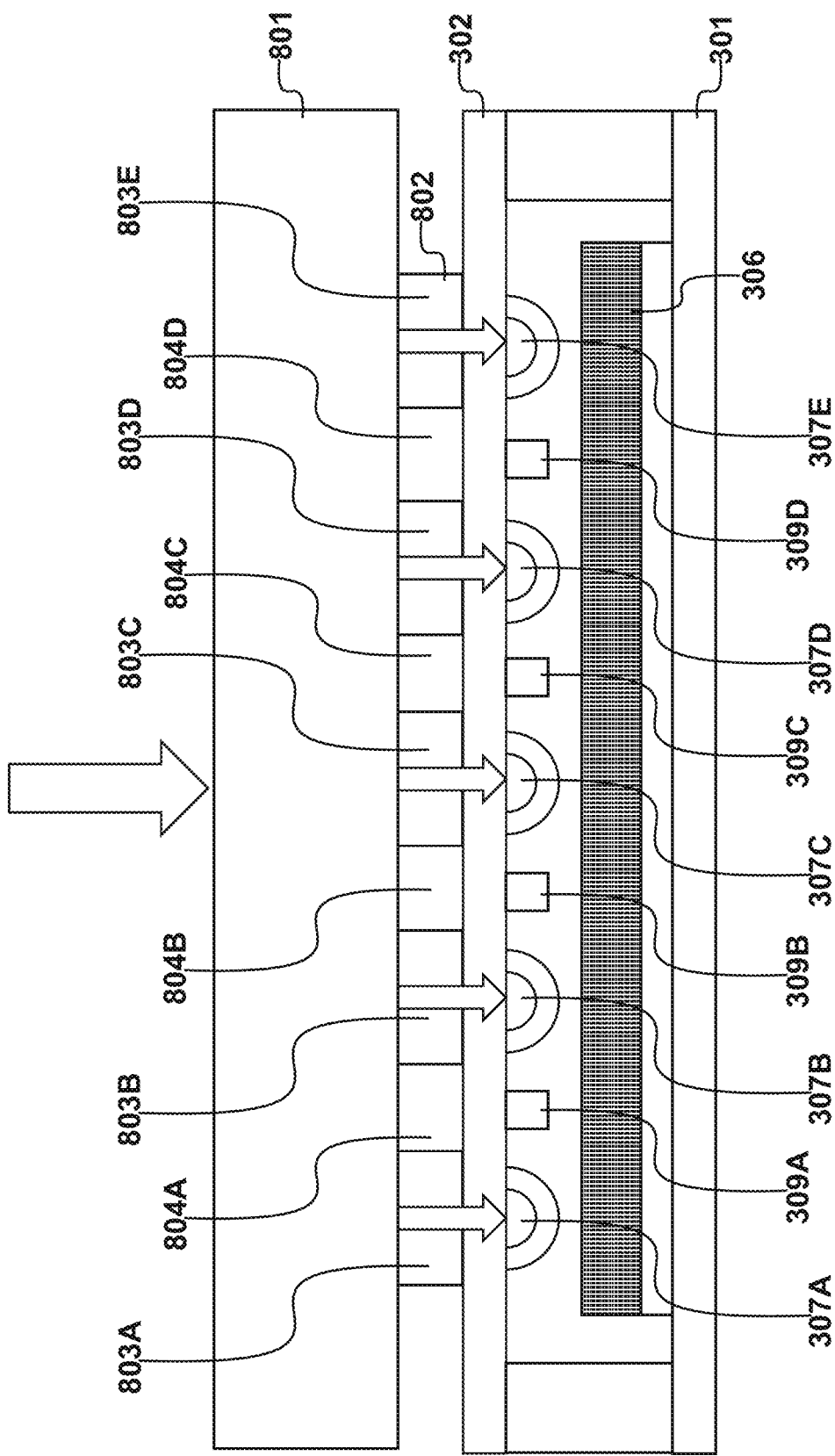
FIG. 8 shows a force sensing device in accordance with the present invention when laminated to a cover layer.

Force sensing device 301 may be incorporated in practice into an electronic device and is typically integrated with a cover layer in the manner shown in FIG. 8.

Force sensing device 301 shown in FIG. 8 is substantially similar to any of the embodiments described previously, comprising a sensing array having a plurality of conductive columns and conductive rows which are arranged to define a plurality of intersections. Each intersection comprises a pressure sensitive element of an electro-active layer and a force concentrating structure at each intersection.

In the embodiment, cover layer 801 is positioned substantially parallel to substrate 302 such that an applied force in use is applied to a cover layer 801 directly rather than to substrate 302.

Cover layer 801 is integrated to force sensing device 801 by means of a lamination process utilizing a lamination adhesive. Thus, in the embodiment, cover layer 801 is laminated to force sensing device 301 by means of adhesive layer 802. Adhesive layer 802 comprises an adhesive 803 and a plurality of openings 804 in adhesive layer 802. In an embodiment, the adhesive comprises a continuous adhesive film.

Cover layer 801 may be of any suitable thickness or rigidity which is typically dependent on the application. In an embodiment, cover layer 801 comprises an LED or OLED display which may be rigid or flexible/foldable. In a further embodiment, cover layer 801 comprises a track pad.

Typically, cover layer 801 provides a mechanical constraint on force sensing device 301 in that cover layer 801 would typically act to distribute any force applied to cover layer 801 over a larger area thereby decreasing the effective force applied. This presents the issue of activating a plurality of pressure sensitive elements at each intersection while also providing a force into the spaces between each intersection which as noted previously can be undesirable.

In the embodiment, adhesive layer 802 comprises a pattern which conforms to the configuration of force sensing device 301. Spacer layer comprises a plurality of spacer elements 309 which are positioned between each force concentrating structure 307. In the embodiment, openings 804 are aligned with spacer elements 309 such that an air gap is created between cover layer 801 and substrate 302 of force sensing device 301. This arrangement can be utilized to aid force transfer onto force sensing device 301 by directing the force from cover layer 801 to the intersections and pressure sensitive elements only without the need to include further spacer layers.

In conventional force sensing devices utilizing sensing arrays, a spacer layer is required to hold the layers apart and reduce initial pressure on the electro-active layer. However, this creates an issue in that the spacer elements prevent force transmission or pressure transfer to the electro-active layer 306. Thus, in this embodiment, the arrangement of the adhesive layer in respect of the spacer elements creates a shear effect on substrate 302 such that the force is distributed to the intersections in the sensing array. This is because an air gap is created in openings 804 which functions in the manner of a spring.

The invention claimed is:

1. A force sensing device comprising:
    a sensing array comprising a first conductive layer and a second conductive layer;
    said first conductive layer comprising a plurality of conductive rows and said second conductive layer comprising a plurality of conductive columns, said plurality of conductive rows and said plurality of conductive columns being arranged to define a plurality of intersections;
    an electro-active layer overlaying said first conductive layer, said electro-active layer comprising a pressure sensitive element at each intersection of said plurality of intersections;
    a force concentrating structure positioned at each intersection of said plurality of intersections on said second conductive layer, wherein said force concentrating structure provides a protrusion of said second conductive layer into an air gap between said first conductive layer and said second conductive layer; and
    a cover layer laminated to said force sensing device by means of an adhesive layer, said adhesive layer comprising an adhesive and a plurality of openings in said adhesive.

2. The force sensing device of claim 1, wherein said force concentrating structure comprises a dielectric material.

3. The force sensing device of claim 1, wherein said force concentrating structure comprises a dielectric ink.

4. The force sensing device of claim 1, wherein said force concentrating structure comprises a plurality of layers.

5. The force sensing device of claim 1, wherein said force concentrating structure comprises an embossed substrate.

6. The force sensing device of claim 1, wherein said pressure sensitive element comprises a quantum tunnelling material.

7. The force sensing device of claim 1, further comprising a spacer layer comprising a plurality of spacer elements, wherein said plurality of openings are aligned with said plurality of spacer elements to create an air gap between said cover layer and a supporting substrate of said force sensing device.

8. The force sensing device of claim 1, further comprising a spacer layer comprising a plurality of spacer elements.

9. The force sensing device of claim 1, wherein a height of said force concentrating structure is at least six microns.

10. The force sensing device of claim 1, further comprising a first array of force concentrating structures having a first height, and a second array of force concentrating structures having a second height, wherein said first height and said second height are substantially different.

11. An electronic device comprising the force sensing device of claim 1.

12. A method of producing a force sensing device, comprising steps of:
    printing a sensing array in the form of a first conductive layer comprising a plurality of conductive rows and a second conductive layer comprising a plurality of conductive columns, arranged to define a plurality of intersections;
    printing an electro-active layer over said first conductive layer such that said electro-active layer comprises a pressure sensitive element at each intersection of said plurality of intersections;
    providing a force concentrating structure at each intersection of said plurality of intersections on said second conductive layer to provide a protrusion of said second conductive layer into an air gap between said first conductive layer and said second conductive layer; and
    laminating a cover layer to said force sensing device by means of an adhesive layer, said adhesive layer comprising an adhesive and a plurality of openings in said adhesive.

13. The method of claim 12, wherein said step of providing a force concentrating structure comprises a step of:
    depositing a dielectric material onto a substrate.

14. The method of claim 13, wherein said step of depositing comprises printing a plurality of layers of dielectric material.

15. The method of claim 13, wherein said step of depositing comprises providing a bead of dielectric material at each intersection of said plurality of intersections.

16. The method of claim 13, wherein said step of depositing comprises providing a plurality of beads of dielectric material at each intersection of said plurality of intersections.

17. A method of producing a force sensing device, comprising steps of:
    printing a sensing array in the form of a first conductive layer comprising a plurality of conductive rows and a second conductive layer comprising a plurality of conductive columns, arranged to define a plurality of intersections;
    printing an electro-active layer over said first conductive layer such that said electro-active layer comprises a pressure sensitive element at each intersection of said plurality of intersections; and
    providing a force concentrating structure at each intersection of said plurality of intersections on said second conductive layer to provide a protrusion of said second conductive layer into an air gap between said first conductive layer and said second conductive layer,
    wherein said step of providing a force concentrating structure comprises a step of:
        depositing a dielectric material onto a substrate, wherein said step of depositing comprises providing a bead of dielectric material at each intersection of said plurality of intersections.

\* \* \* \* \*